(12) United States Patent
Griffith

(10) Patent No.: US 11,407,456 B2
(45) Date of Patent: Aug. 9, 2022

(54) ROTATING SPARE TIRE LIFT SYSTEM

(71) Applicant: Rivian IP Holdings, LLC, Plymouth, MI (US)

(72) Inventor: Eric Scott Griffith, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 222 days.

(21) Appl. No.: 16/883,568

(22) Filed: May 26, 2020

(65) Prior Publication Data

US 2021/0371020 A1    Dec. 2, 2021

(51) Int. Cl.
*B62D 43/10* (2006.01)
*B62D 43/00* (2006.01)
*B62D 33/023* (2006.01)

(52) U.S. Cl.
CPC ........... *B62D 43/10* (2013.01); *B62D 33/023* (2013.01); *B62D 43/002* (2013.01); *B62D 43/005* (2013.01)

(58) Field of Classification Search
CPC ..... B62D 43/10; B62D 33/023; B62D 43/005
USPC ..................... 296/37.2, 37.3, 187.05, 187.08; 224/42.12, 42.23, 42.24, 42.26; 414/463
See application file for complete search history.

(56) References Cited

U.S. PATENT DOCUMENTS

| | | | | |
|---|---|---|---|---|
| 1,761,916 A | * | 6/1930 | Arthurhebner | B62D 43/04 414/466 |
| 2,063,092 A | * | 12/1936 | Groden | B62D 43/10 414/463 |
| 4,428,513 A | * | 1/1984 | Delmastro | B62D 43/04 414/466 |
| 5,026,107 A | | 6/1991 | Hess | |
| 5,951,232 A | * | 9/1999 | Yu | B62D 43/10 414/466 |
| 7,900,989 B2 | | 3/2011 | Edwards | |

\* cited by examiner

*Primary Examiner* — D Glenn Dayoan
*Assistant Examiner* — Sunsurraye Westbrook
(74) *Attorney, Agent, or Firm* — Haley Guiliano LLP

(57) ABSTRACT

A system for accessing a wheel of a vehicle includes a support, a carrier, and a hinge joint. The support is affixed in a recess of a vehicle bed, and is positioned below the surface of the vehicle bed. The carrier is configured to be affixed to the wheel. When the carrier is affixed to the wheel, both the carrier and the wheel are accommodated in the recess and move as a substantially rigid body. The hinge joint couples the support and the carrier. The hinge joint has an axis substantially parallel to the ground and laterally across the vehicle bed. The carrier is capable of rotating about the hinge joint. The carrier and the wheel are capable of being rotated about the hinge joint out of the recess and onto the vehicle bed. One or more rotational elements may be included to affect rotational motion of the carrier.

20 Claims, 6 Drawing Sheets

ROTATING SPARE TIRE LIFT SYSTEM

INTRODUCTION

The present disclosure is directed towards a spare tire lift system, and more particularly towards a system for rotating a spare tire from under a vehicle bed.

A truck's spare tire is typically located behind the rear axle and mounted to the underside of the frame. A full-size spare tire can be very difficult to lift, and typically a winch is provided with which the user can lower the spare tire from the underside of the bed/frame of the truck bed. In such an arrangement, the spare is exposed to the elements. It would be advantageous to protect the spare tire from the environment and prevent awkward lifting postures.

SUMMARY

The present disclosure is directed to systems for accessing a spare tire located underneath a cargo bed floor. For example, the spare tire can be easily lifted above the bed floor for removal. Furthermore, the operation of removing the spare tire is rotational from a recess in the bed that keeps the tire clean and away from road debris.

In some embodiments, the system for accessing a wheel of a vehicle includes a support, a carrier and a hinge joint. The support is affixed in a recess of a vehicle bed and is positioned below the surface of the vehicle bed. The carrier is configured to be affixed to the wheel, and when the carrier is affixed to the wheel, both the carrier and the wheel are accommodated in the recess. The hinge joint couples the support and the carrier. The hinge joint has an axis substantially parallel to the ground and laterally across the vehicle bed, and the carrier is capable of rotating about the hinge joint. For example, the carrier and the wheel are capable of being rotated about the hinge joint out of the recess and onto the vehicle bed. In some embodiments, the hinge joint constrains the carrier to achieve only rotation motion relative to the support.

In some embodiments, the system includes a recess cover configured as part of the vehicle bed floor, and a hinge mechanism affixed to the vehicle bed allowing the recess cover to rotate to uncover the recess in the vehicle bed. In some embodiments, the vehicle includes a tailgate configured to move through a first trajectory, the recess cover is configured to move through a second trajectory, and the tailgate and the recess cover do not interfere at any position in the first trajectory and the second trajectory.

In some embodiments, the system includes a strap affixed to the carrier, and applying tension to the strap causes rotation of the carrier about the hinge joint. In some embodiments, the system includes a strap affixed to the wheel, and applying tension to the strap causes rotation of the carrier and the wheel about the hinge joint.

In some embodiments, the system includes a rotational element for affecting rotational kinematics of the carrier and the wheel. The rotational element optionally includes a torsion spring, rotational damper, a rotational detent, a hard stop, any other suitable rotational element, or any combination thereof.

In some embodiments, the wheel has a center point and a diameter corresponding diameter spanning from a rearward point to a forward point, and the hinge joint is arranged between the center point and the rearward point. For example, in some embodiments, the hinge joint is arranged between one-fourth and one-third the diameter from the rearward point.

In some embodiments, in a stowed position, the wheel is arranged in the recess below the hinge joint and below the recess cover. In some such embodiments, in an open position, the wheel is arranged above the hinge joint, rotated about the hinge joint substantially 180° relative to the stowed position.

In some embodiments, the vehicle bed includes a fixed portion that is not configured to rotate. In some such embodiments, in a stowed position, the wheel is arranged partially underneath the fixed portion of the vehicle bed and, in an open position, the wheel is arranged above the fixed portion of the vehicle bed. In some embodiments, the fixed portion of the vehicle bed is arranged at the rear of the vehicle bed.

In some embodiments, the system for accessing a wheel of a vehicle includes a bin structure, a carrier, and a hinge joint. The bin structure forms a recess arranged below a vehicle bed of the vehicle. The carrier is configured to be affixed to the wheel, and when the carrier is affixed to the wheel, both the carrier and the wheel are accommodated in the recess. The hinge joint couples the bin structure and the carrier such that the carrier is capable of rotating about the hinge joint. The carrier and the wheel are capable of being rotated about the hinge joint out of the recess and onto the vehicle bed.

In some embodiments, the vehicle bed includes a fixed portion that is not configured to rotate. In a stowed position, the wheel is arranged partially underneath the fixed portion of the vehicle bed and, in an open position, the wheel is arranged above the fixed portion of the vehicle bed. In some embodiments, the fixed portion of the vehicle bed is arranged at the rear of the vehicle bed.

In some embodiments, the bin structure includes a forward portion and a rearward portion, with the rearward portion being deeper than the forward portion to accommodate the trajectory of the wheel.

In some embodiments, the system for accessing a wheel of a vehicle includes a carrier and a hinge joint. The carrier is configured to be affixed to the wheel, and when the carrier is affixed to the wheel, both the carrier and the wheel are accommodated in a recess arranged below the vehicle bed. The hinge joint couples the carrier to the vehicle such that the carrier is capable of rotating about the hinge joint. In a stowed position, the wheel is arranged underneath a fixed portion of the vehicle bed, and the carrier and the wheel are capable of being rotated about the hinge joint out of the recess and onto the vehicle bed. In some embodiments, the fixed portion of the vehicle bed is arranged at the rear of the vehicle bed.

In some embodiments, in the stowed position, the wheel is arranged in the recess below the hinge joint and below the recess cover and, in an open position, the wheel is arranged above the hinge joint, rotated about the hinge joint substantially 180° relative to the stowed position.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to systems for managing spare tire access in a vehicle bed. Regarding trucks, or other vehicles having a cargo bed, a full-size spare tire and rim (e.g., the assembly referred to herein as a "spare tire" or "wheel") can be heavy (e.g., more than fifty pounds, eighty pounds) and cumbersome. In order to stow the spare tire under the frame, below the vehicle bed, there must be no components in the way to block access. Further, stowing a spare tire under a vehicle bed exposes the spare tire to the elements and mechanical damage from underneath the vehicle. The systems of the present disclosure allow the spare tire to be removed from above the bed, through an access panel in the bed. The weight of the full-size spare tire, which is very difficult to lift even by the strongest of individuals, is assisted using a mechanism that allows mechanical advantage to be employed. The systems of the present disclosure avoid the need for the user to deadlift the spare tire out of the bin, which is dangerous and not ergonomic for the user.

The spare tire carrier allows easy removal of the spare tire from a rear bin. The spare tire carrier is hinged to a structure, and in some embodiments, the assembly achieves one or more design requirements. For example, in some embodiments, the spare tire carrier acts as the supporting structure for the spare tire. To illustrate, the carrier keeps the spare tire securely mounted to the underside of the cargo bed floor in all vehicle use cases (e.g., on road, off road, roads with potholes). The carrier also may serve as an isolation for any noise-vibration-harshness (NVH) concerns that may be present with a loose tire moving around or otherwise unsecured in a bin. In a further example, the carrier may be coupled to a supporting structure that must meet the rear crash requirements and keep the spare tire securely in place in case of a rear impact crash. In a further example, the spare tire carrier acts as the means for removing the spare tire easily from the rear bin. When in the bin, the spare tire cannot be lifted straight upwards (e.g., in the Z direction) because the rear is underneath the solid bed floor, possibly including the tailgate. To illustrate, in a top down plan view with the bin lid fully opened, the spare tire need not be completely visible.

Figure 1:
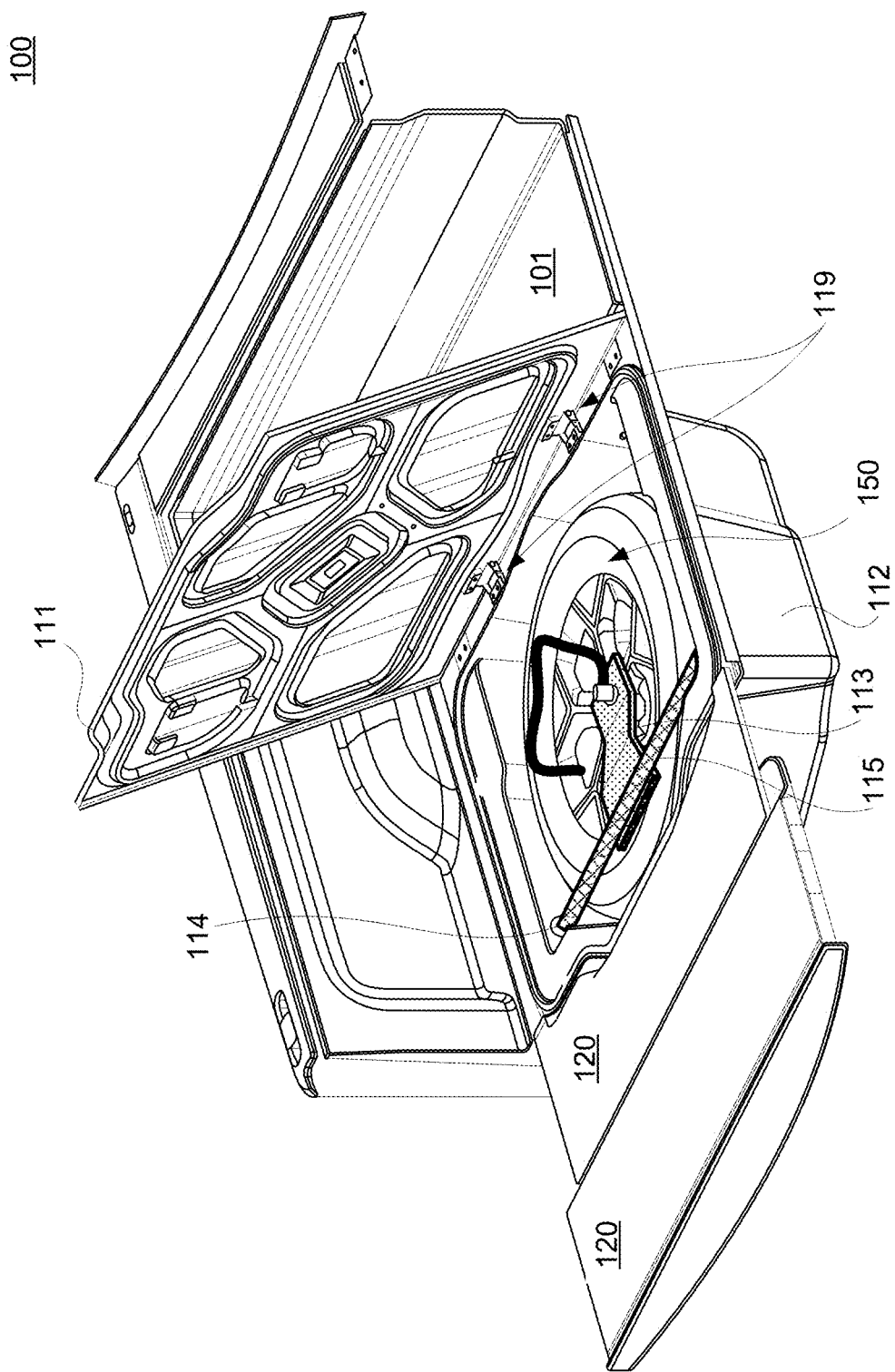
FIG. 1 shows a perspective view of an illustrative wheel assist system arranged in a recess of a vehicle bed, in accordance with some embodiments of the present disclosure.

FIG. 1 shows a perspective view of an illustrative wheel assist system arranged in a recess of vehicle bed 101, in accordance with some embodiments of the present disclosure. The wheel assist system includes panel 111 (e.g., also referred to as a "recess cover"), bin 112 (e.g., also referred to as a "recess"), carrier 113, hinge joint 115, structure 114 to which hinge joint 115 is attached (e.g., also referred to as a "support"), all configured to manage stowing and accessing spare tire 150 of vehicle 100. Vehicle 100 includes cargo bed 101 with a rear storage compartment underneath the bed floor (e.g., bin 112 in bed 101). In some embodiments, bin 112 includes room to store extra items (e.g., aside from spare tire 150) securely and out of sight (e.g., for security, aesthetic purposes). In some embodiments, bin 112 is large enough to accommodate a full-size spare tire (e.g., spare tire 150) although it will be understood that bin 112 may be sized to accommodate any suitable sized spare tire. Spare tire 150 is affixed to otherwise engaged with carrier 113, which is coupled via hinge joint 115 to structure 114, which allows removal of spare tire 150 from bin 112.

Spare tire 150 fits underneath tailgate 120 in the closed position, with panel 111 configured to act as a bed surface and a cover for spare tire 150. This arrangement may create issues with designing bin 112 to be useable with tailgate 120 in any position. For example, at the rearward end of bed 101 is positioned tailgate 120 and any suitable tailgate mechanisms allowing motion of tailgate 120. For example, if the bin lid (i.e., panel 111) is not fully closed, an automatic tailgate (e.g., tailgate 120) could be damaged when they come into contact if they interfere in some panel-tailgate position configurations. Further, if tailgate 120 were to constrain panel 111, then panel 111 might not be movable with tailgate 120 in the constraining position (e.g., the tire is inaccessible, the bin is inaccessible or inescapable). In some embodiments, the floor of bed 101 includes multiple components (e.g., panels) joined together. In some embodiments, a fixed bed floor panel may be included towards the front of bed 101. In some such embodiments, panel 111 is positioned further rearward, and with bin 112 closed, panel 111 matches the standard bed floor, with both acting as the load floor of bed 101. In some embodiments, bin 112 includes a sealed compartment able to prevent water from entering bin 112 (e.g., even in a fully submerged situation).

In some embodiments, panel 111 is affixed with hinges (e.g., hinge joints 119, as illustrated) at the edge closest to the front of vehicle 100. In some embodiments, a latching mechanism or other securement is arranged near or at the edge of panel 111 nearest to the rear of vehicle 100.

FIGS. 2A-2E show side views of illustrative wheel assist system 200 in various configurations. To illustrate, system 200 may represent an example of the wheel assist system of FIG. 1. When opened, panel 211 opens clockwise with the edge towards the rear of the vehicle lifting up and rotating about hinge joint 219, in general, towards the front of the vehicle. In some embodiments, this operation releases the seal from panel 211 to bin 112 and allows access to the contents of bin 212.

Figure 2A:
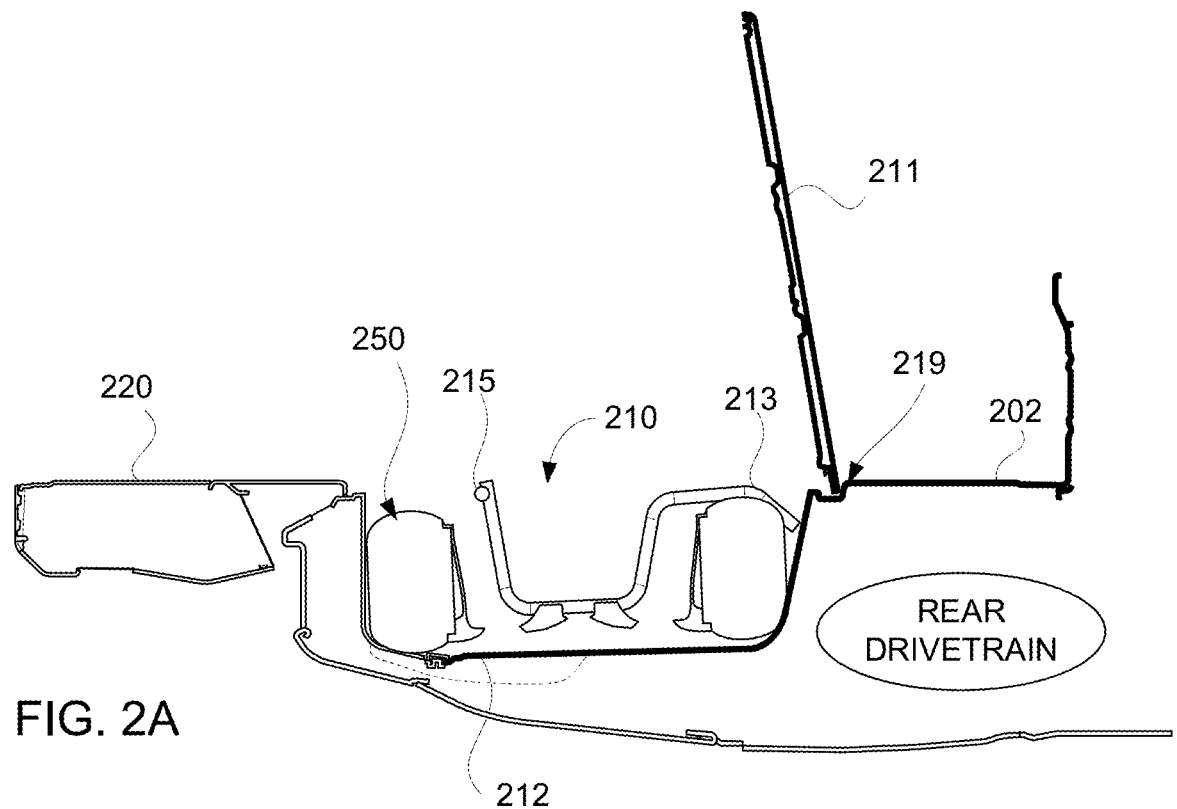
FIG. 2A shows a cross-sectional side view of an illustrative wheel assist system arranged in a recess of a vehicle bed, in a stowed configuration, in accordance with some embodiments of the present disclosure.

FIG. 2A shows a cross-sectional side view of an illustrative wheel assist system 210 arranged in recess 212 of vehicle bed 201, in a stowed configuration, in accordance with some embodiments of the present disclosure. System 210 includes panel 211 (e.g., also referred to as a "recess cover"), bin 212 (e.g., also referred to as a "recess"), carrier 213, hinge joint 215, and a structure to which hinge joint 215 is attached (not shown in FIGS. 2A-2E), all configured to manage stowing and accessing spare tire 250. Panel 211, as illustrated in FIG. 2A, is in an open configuration (e.g., rotated open about hinge joint 219), while bed panel 202 remains in place (e.g., panels 211 and 202 make up all or part of a vehicle cargo bed). Tailgate 220, as illustrated, is in an open configuration, thus allowing a user to stand behind the vehicle while accessing wheel assist system 210. In an illustrative example, spare tire 250 may be affixed to carrier 213 using one or more lug nuts or other fasteners. As illustrated, bin 212 may be dished, with the bottom of bin 212 indicated by the dotted line (e.g., such that spare tire 250 clears the bottom when rotating).

Figure 2B:
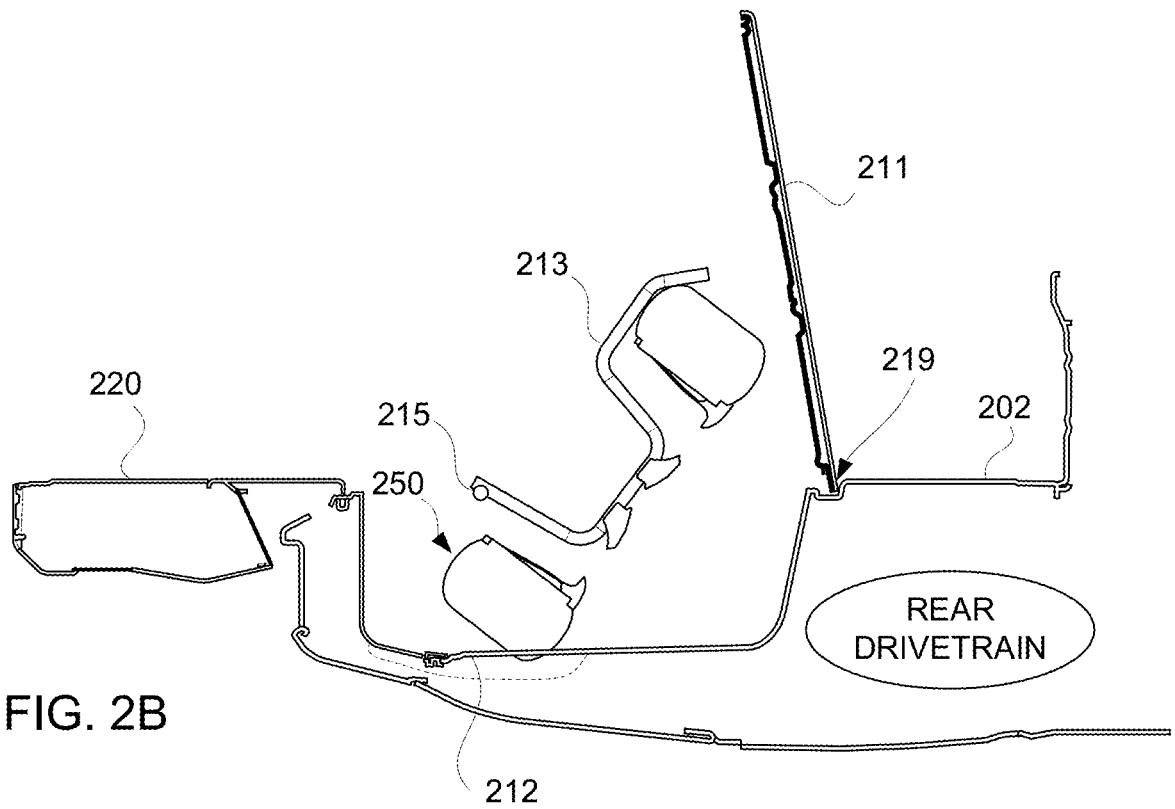
FIG. 2B shows a cross-sectional side view of the illustrative wheel assist system of FIG. 2A, in a first partially open configuration, in accordance with some embodiments of the present disclosure.

FIG. 2B shows a cross-sectional side view of illustrative wheel assist system 210 of FIG. 2A, in a first partially open configuration, in accordance with some embodiments of the present disclosure. For example, if force is applied (e.g., to a strap or handle affixed to carrier 213, spare tire 250, or both) to carrier 213 or spare tire 250, the assembly of carrier and spare tire 250 may rotate about hinge joint 215 from the stowed configuration of FIG. 2A to the first partially open configuration of FIG. 2B.

Figure 2C:
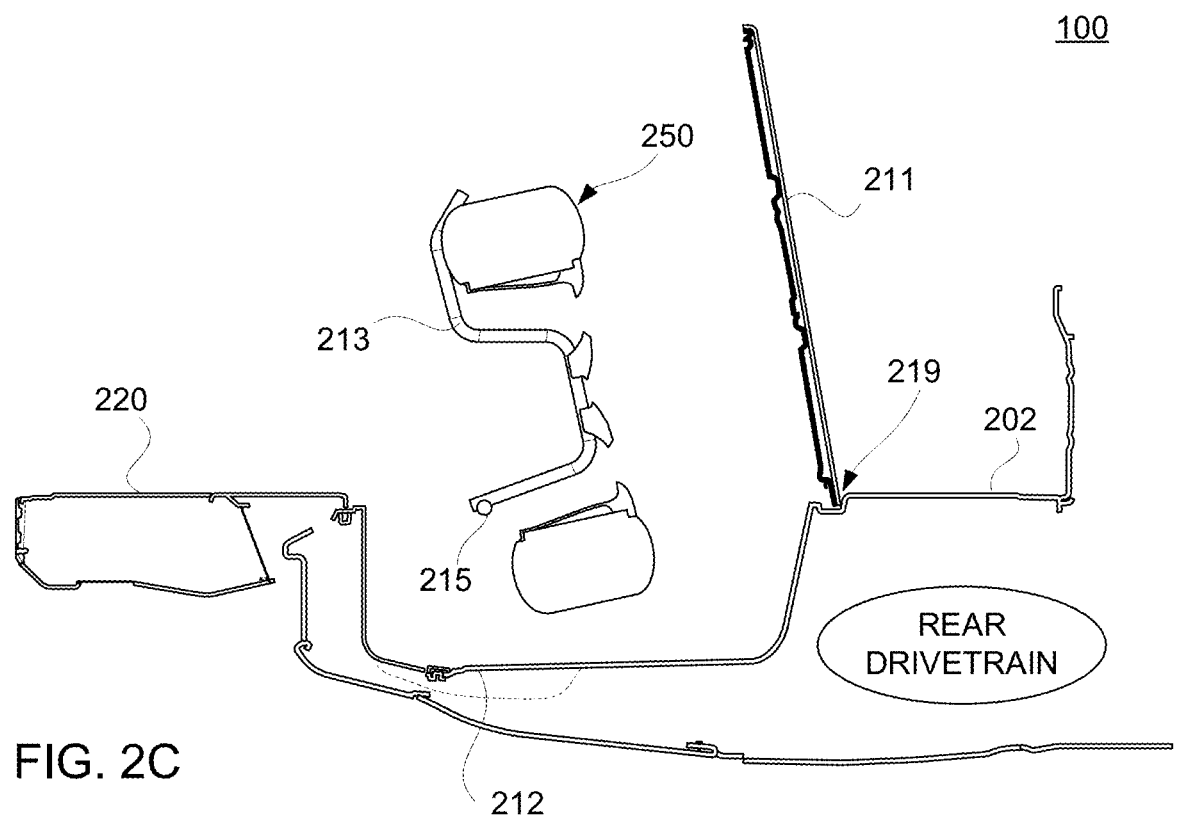
FIG. 2C shows a cross-sectional side view of the illustrative wheel assist system of FIG. 2A, in a second partially open configuration, in accordance with some embodiments of the present disclosure.

FIG. 2C shows a cross-sectional side view of illustrative wheel assist system 210 of FIG. 2A, in a second partially open configuration, in accordance with some embodiments of the present disclosure. For example, if force is further applied (e.g., to a strap or handle affixed to carrier 213, spare tire 250, or both) to carrier 213 or spare tire 250, the assembly of carrier and spare tire 250 may rotate about hinge joint 215 from the first partially open configuration of FIG. 2B to the first partially open configuration of FIG. 2C.

Figure 2D:
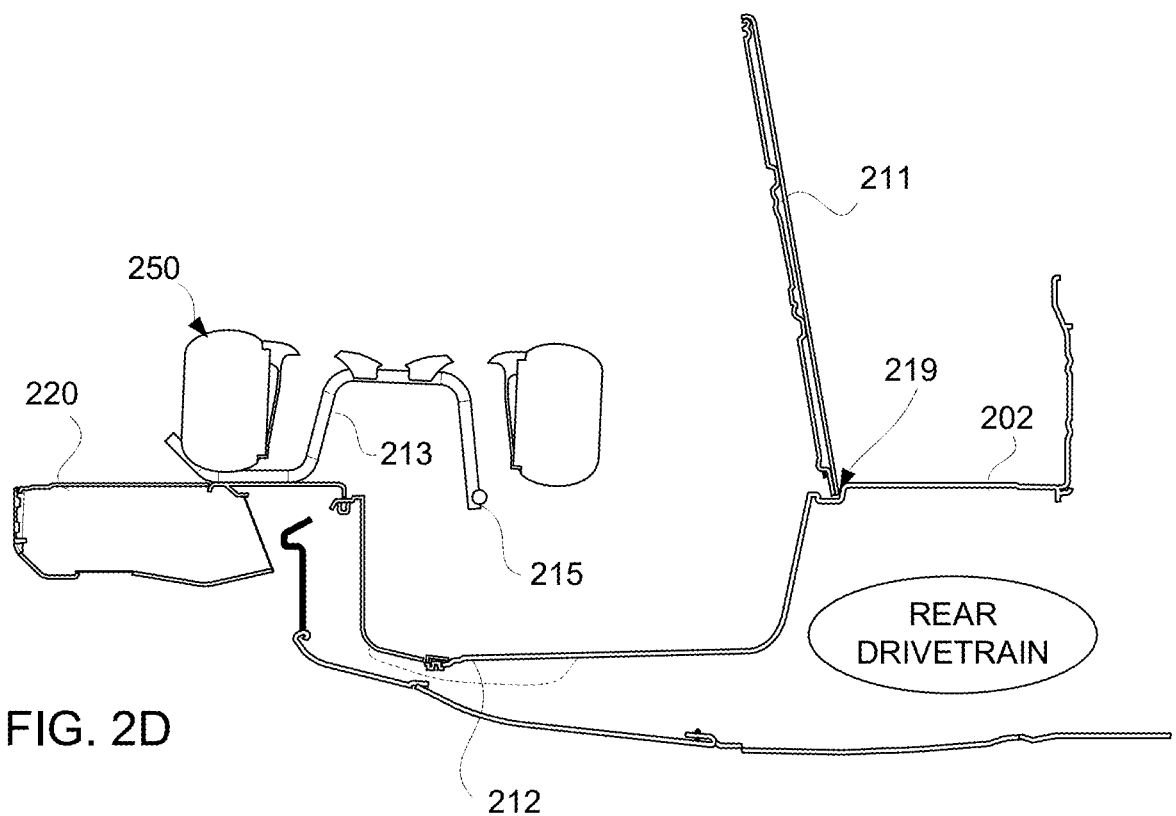
FIG. 2D shows a cross-sectional side view of the illustrative wheel assist system of FIG. 2A, in a fully open configuration, in accordance with some embodiments of the present disclosure.

FIG. 2D shows a cross-sectional side view of illustrative wheel assist system 210 of FIG. 2A, in a fully open configuration, in accordance with some embodiments of the present disclosure. For example, if force is further applied (e.g., to a strap or handle affixed to carrier 213, spare tire 250, or both) to carrier 213 or spare tire 250, the assembly of carrier and spare tire 250 may rotate about hinge joint 215 from the second partially open configuration of FIG. 2C to the fully open configuration of FIG. 2D.

Figure 2E:
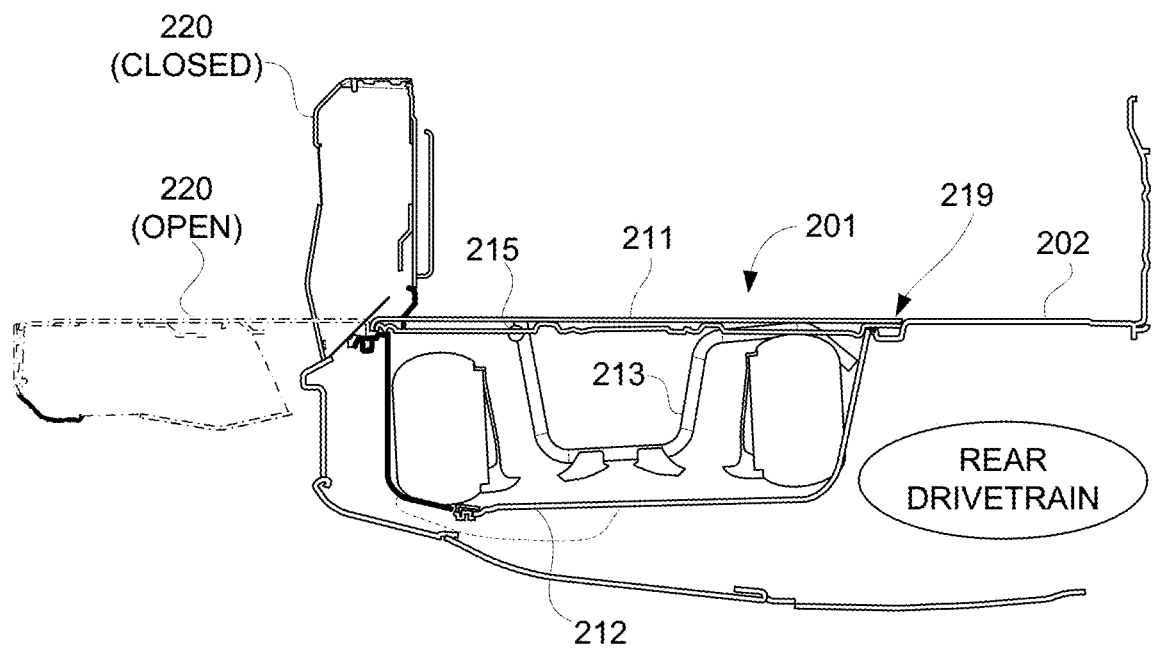
FIG. 2E shows a cross-sectional side view of the illustrative wheel assist system of FIG. 2A, in a stowed configuration, with a vehicle tailgate shown in two positions, in accordance with some embodiments of the present disclosure.

FIG. 2E shows a cross-sectional side view of the illustrative wheel assist system of FIG. 2A, in a stowed configuration, with a vehicle tailgate shown in two positions (e.g., "opened" and "closed"), in accordance with some embodiments of the present disclosure. As illustrated, tailgate 220 is configured to rotate about an axis through a trajectory of at least 90°. In some embodiments, the interface between tailgate 220 and panel 211 may allow panel 211 to open, close, or otherwise rotate about hinge joint 219 regardless of the position of tailgate 220. In some embodiments, the interface between tailgate 220 and panel 211 need not allow panel 211 to open, unless tailgate 220 is at least partially opened.

In an illustrative example, carrier 213 may couple to a rigid base that fully mounts to the bin, other structure, or bed floor. The carrier also provides attachment to spare tire 250 with a means of securing spare tire 250 to carrier 213. For example, the attachment may include a wingnut on a large threaded rod in the center of the wheel, multiple threaded studs that secure through the wheel's lug-nut holes, any other suitable securement, or any combination thereof.

In some embodiments, the system includes securing points, opposite hinge joint 215, to fasten carrier 213 securely to the surrounding structure of bin 212. For example, the securing points may be capable of being unfastened or otherwise released by the user to rotate and remove spare tire 250. In some embodiments, carrier 213 may include rubber, plastic, any other suitable sacrificial material, or any combination thereof on surfaces that touch spare tire 250, the floor of bed 101, tailgate 120, or any other surface.

In some embodiment, carrier 213 includes a handle to be used to pull the spare tire 250 and carrier 213 out of bin 212. In some embodiments, bin 212 includes a bin liner to seal bin 212 when spare tire 250 is removed or to store cargo when spare tire 250 is not present. In some embodiments, bin 212 may include a compartment in the space inside or outside the diameter of spare tire 250 that can be used to house a vehicle jack, charging cables, tools, or other equipment.

In an illustrative example, in some embodiments, to operate the spare tire mechanism, panel 211 is opened to a position greater than the swing trajectory of spare tire 250. For general vehicle use, for example, carrier 213 and spare tire 250 may be fully fastened to the vehicle. The support structure is fully attached inside bin 212 (e.g., to the sides, bottom, rear, front, or combination thereof). In some embodiments, carrier 213 is attached via hinge joint (e.g., one or more hinging locations) to the support structure on the rear of the vehicle and fastened to the front of bin 212 with latching mechanisms.

For example, to remove spare tire 250, the user may disengage the fasteners of carrier 213 while standing or sitting above bin 212 in bed 201. The user then grabs a handle (or strap) of carrier 213 and pulls generally upwards to rotate the entire unit (e.g., spare tire 250 and carrier 213) about hinge joint 215. Spare tire 250 moves from a position roughly horizontal underneath the floor of bed 201 to a position roughly horizontal above bed 201. For example, spare tire 250 may rotate approximately 180°, although this might be more or less than 180° depending on the final orientation of spare tire 250 within the vehicle. Once in the final position (e.g., the "open" position), spare tire 250 will be flipped over, thus exposing the fastening mechanism to the user. The user may then disengage the fasteners and remove spare tire 250 from the open tailgate 220 or floor of bed 201 without going into the bin 212. When finished, the user may return spare tire 250 (or another wheel from the vehicle) to carrier 213, which is easy to access on tailgate 220. The user may reinstall the fasteners for the wheel and rotate carrier 213 back into bin 212. For example, in some embodiments, the final operation is to fasten carrier 213 back into the bin 212. In an illustrative example, the fasteners may automatically fasten with the force of the wheel and carrier 213 falling back into bin 212 (e.g., latching fasteners or catches).

In some embodiments, to provide mechanical advantage, hinge joint 215 is positioned towards the center of gravity of spare tire 250. For example, this positioning lessens the overall force needed to lift spare tire 250 out of bin 212. To illustrate, spare tire 250 may be lifted straight out of bin 212 requiring the user to hold the entire weight of spare tire 250 throughout the removal procedure. With the position of hinge joint 215 nearer the center of gravity of spare tire 250, this minimizes the maximum force the user needs to exert at any time during removal. Spare tire 250 will partially rotate about an axis onto the floor of bed 201.

In some embodiments, panel 211 is a recess cover configured as part of the vehicle bed floor, and is affixed to a hinge mechanism affixed to bed 201 allowing the recess cover to rotate to uncover the recess (e.g., bin 212) in the vehicle bed (e.g., bed 201).

In some embodiments, tailgate 220 is configured to move through a first trajectory, panel 211 is configured to move through a second trajectory, and tailgate 220 and panel 211 do not interfere at any position in the first trajectory and the second trajectory.

In some embodiments, a strap is affixed to the carrier. For example, when tension is applied to the strap, the tension causes rotation of carrier 213, and spare tire 250 if installed, about hinge joint 215. In some embodiments, a strap is affixed to the wheel. For example, when tension is applied to the strap, the tension causes rotation of the carrier, and spare tire 250 if installed, about the hinge joint.

In some embodiments, the wheel assist system includes a rotational element (not shown in FIGS. 2A-2E) for affecting rotational kinematics of carrier 213 and spare tire 250. The rotational element may include, for example, a torsion spring, rotational damper, a rotational detent, a hard stop, any other suitable element, or any combination thereof.

In some embodiments, hinge joint 215 constrains the carrier to achieve only rotation motion relative to the support (e.g., constraining against translation or other rotation about more than one axis).

In some embodiments, in a stowed position, spare tire 250 is arranged in bin 212 below hinge joint 215 and below panel 211. In some embodiments, in an open position, spare tire 250 is arranged above hinge joint 215, rotated about hinge joint 215 substantially 180° relative to the stowed position.

Figure 3A:
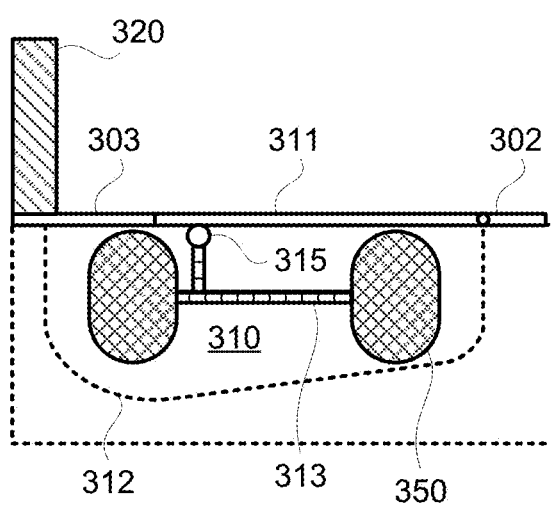
FIG. 3A shows cross-sectional side view of an illustrative wheel assist system, with a rear panel, and a spare tire in a stowed configuration, in accordance with some embodiments of the present disclosure.
Figure 3B:
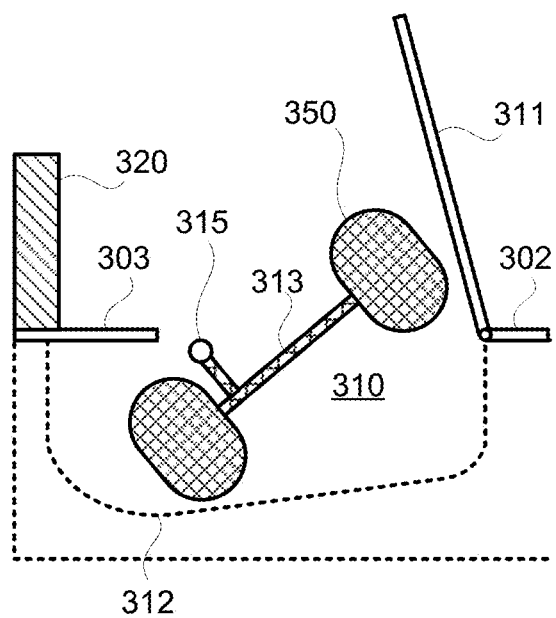
FIG. 3B shows cross-sectional side view of the illustrative wheel assist system of FIG. 3A, with a rear panel, and the spare tire in a partially open configuration, in accordance with some embodiments of the present disclosure.

FIG. 3A shows cross-sectional side view of illustrative wheel assist system 310, with rear panel 303, and spare tire 350 in a stowed configuration, in accordance with some embodiments of the present disclosure. FIG. 3B shows cross-sectional side view of illustrative wheel assist system 310 of FIG. 3A, with rear panel 303, and spare tire 350 in a partially open configuration, in accordance with some embodiments of the present disclosure. System 310 includes panel 311 (e.g., also referred to as a "recess cover"), bin 312 (e.g., also referred to as a "recess"), carrier 313, hinge joint 315, and a structure to which hinge joint 315 is attached (not shown in FIGS. 2A-2E), all configured to manage stowing and accessing spare tire 350. Panel 311, as illustrated in FIG. 3A, is in a closed configuration (e.g., lying substantially in-plane with panel 302 and rear panel 303). As illustrated, panel 311, panel 302, and rear panel 303 make up all or part of a vehicle cargo bed. Tailgate 320, as illustrated, is in a closed configuration. Because panel 311 and rear panel 303 interface forward of tailgate 320, the trajectory of panel 311 and the trajectory of tailgate 320 are independent (e.g., the trajectories do not interfere with each other). In some embodiments, rear panel 303 may be as short (e.g., along the front-rear axis) as possible to allow bin 312 to be as rearward as possible, without panel 311 interfering with tailgate 320. In some embodiments, as illustrated, bin 312 may include a forward portion and a rearward portion, with the rearward portion being deeper than the forward portion. For example, the shape of bine 312 may accommodate spare tire 350 throughout its entire trajectory (e.g., from a stowed position to an open position).

The multi-piece construction of panel 311, panel 302, and rear panel 303 allows an overhang at the edge towards the rear of the vehicle. This allows bin 312 to fit underneath tailgate 320 without having panel 311 or any portion thereof also fit underneath tailgate 320 of the vehicle. Thus, panel 311 may be opened regardless of the position of tailgate 320.

Figure 4:
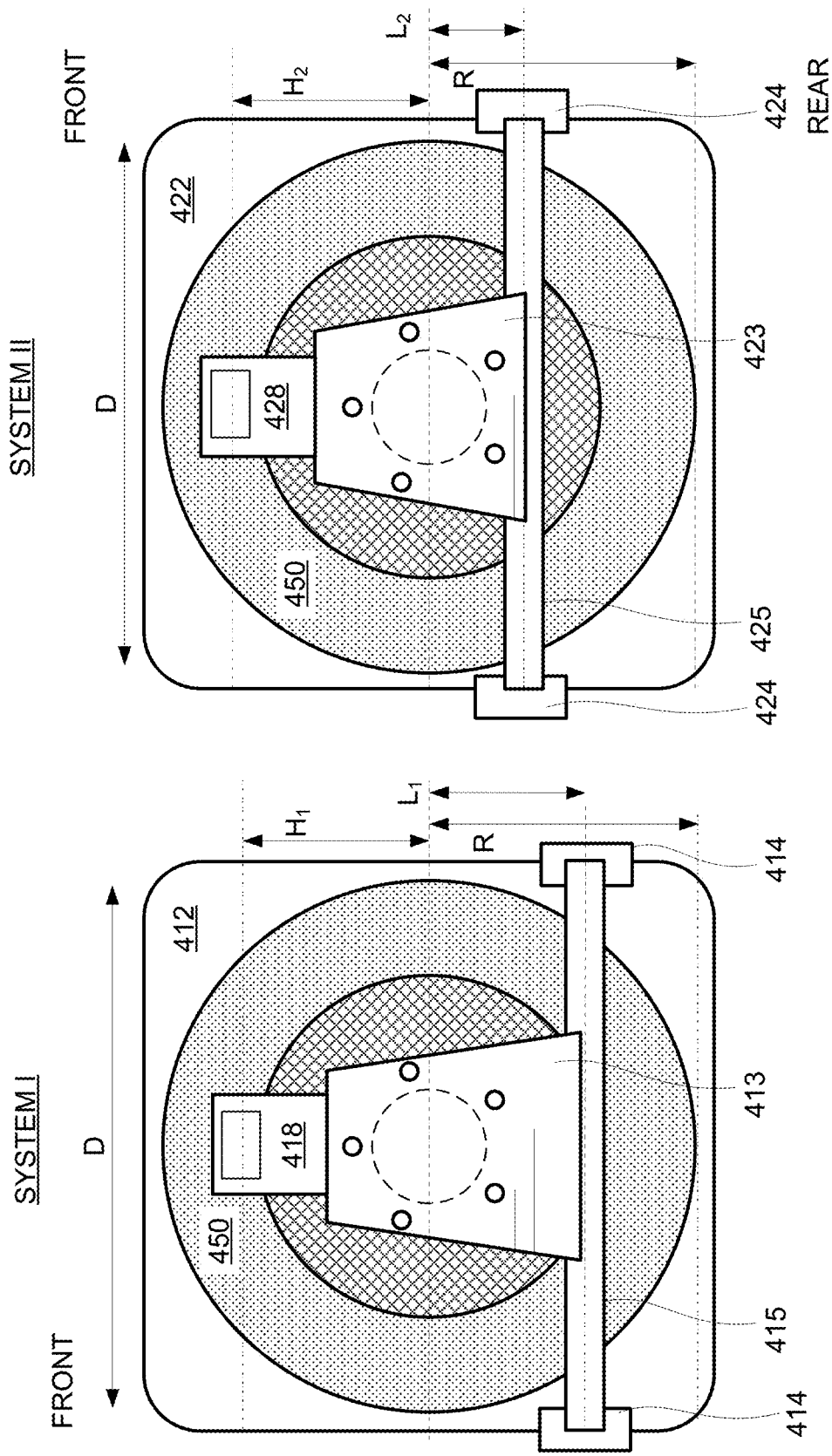
FIG. 4 shows a top view of two illustrative wheel assist systems having spatial dimensions annotated, in accordance with some embodiments of the present disclosure.

FIG. 4 shows a top view of two illustrative wheel assist systems having spatial dimensions annotated, in accordance with some embodiments of the present disclosure. The systems, system I and system II, are compared and contrasted in the following description.

The first wheel assist system ("system I"), illustrated on the left side of FIG. 4, includes bin 412 (e.g., also referred to as a "recess"), carrier 413, structure 414 (e.g., also referred to as a "support"), hinge joint 415, and handle 418 (e.g. to which a strap may optionally be attached), all configured to manage stowing and accessing spare tire 450. As illustrated, spare tire 450 has diameter "D," and radius "R" that is equal to D/2. The rotational axis of hinge joint 415 is positioned a distance "$L_1$" from the centerline of spare tire 450 in the "front-rear" direction (as identified by "FRONT" and "REAR" in FIG. 4). Accordingly, the axis of hinge joint 415 is positioned a distance R-$L_1$" from the rear end of spare tire 450. As illustrated, the grip of handle 418 is positioned a distance of "$H_1$" from the rotational axis of hinge joint 415, towards the front of the vehicle.

The second wheel assist system ("system II"), illustrated on the right side of FIG. 4, includes bin 422 (e.g., also referred to as a "recess"), carrier 423, structure 424 (e.g., also referred to as a "support"), hinge joint 425, and handle 428 (e.g. to which a strap may optionally be attached), all configured to manage stowing and accessing spare tire 450. As illustrated, spare tire 450 has diameter "D," and radius "R" that is equal to D/2. The rotational axis of hinge joint 425 is positioned a distance "$L_2$" from the centerline of spare tire 450 in the "front-rear" direction (as identified by "FRONT" and "REAR" in FIG. 4). Accordingly, the axis of hinge joint 425 is positioned a distance R-$L_2$" from the rear end of spare tire 450. As illustrated, the grip of handle 428 is positioned a distance of "$H_2$" from the rotational axis of hinge joint 425, towards the front of the vehicle.

The amount of physical work needed to lift spare tire 450 is equivalent to the product of the mass of the unit (tire+ rim+carrier), gravity, and the vertical displacement. For example, in a deadlift operation, a user would experience at least the total force from the weight of spare tire 450 through the movement up to the cargo bed floor (e.g., the gravitational weight and any upward acceleration imparted to spare tire 450). By using a rotating carrier (e.g., carrier 413 or 423), the force required by the user is reduced and spread out through a longer distance travelled, which is equivalent to the travel of the handle of the carrier (e.g., carrier 413 or 423). The travel of the spare tire carrier's handle is approximately the circumference of a half circle, with a radius being the distance from the pivot point to the handle (e.g., 180° at a radius of $H_1$ or $H_2$ depending on the handle position). Greater mechanical advantage of the wheel assist system is achieved by positioning the pivot point (e.g., along the rotational axis of hinge joint 415 or 425) as close to the center of gravity of spare tire 450 as the packaging allows. To illustrate, system II will exhibit greater mechanical advantage than system I because $L_2$ is less than $L_1$ (e.g., for same handle position, wherein optionally $H_1$=$H_2$).

Additionally, the space within the bin (e.g., bin 412 or 422) can be used for tools, a vehicle jack, or other equipment, and can be accessed in either the open or closed position of spare tire 450. For example, the bin (e.g., bin 412 or 422) may be designed such that the user can open the lid, and reach into the space around the spare tire and carrier to pull out the equipment they need, without rotating spare tire 450 and the carrier out of the bin. In a further example, the same space in the bin can be accessed once the spare tire and carrier are rotated out of the bin. In an illustrative example, wherein tools are affixed to the carrier and the tire is inverted in the open configuration, the user may need to first remove the spare tire from the carrier to access the equipment (e.g., tools and/or jack). The tools and jack might need to be accessed without needing the spare tire, so the ability to store equipment without removing spare tire 450 may be useful to the user.

In some embodiments, the panel (or "lid") to the bin is attached to the spare tire carrier (e.g., carrier 413 or 423). For example, instead of opening the panel towards the front of the vehicle, the entire unit (e.g., spare tire, carrier, and bin floor) are all together and rotate towards the rear of the vehicle. Further, this configuration would lessen the number of tools and hinges required for the mechanism.

In some embodiments, spare tire 450 has diameter D spanning from a rearward point to a forward point, and spare tire 450 also includes a center point. Hinge joint 415 is arranged between the center point and the rearward point. For example, hinge joint 415 may be arranged between one-fourth and one-third the diameter from the rearward point, or at any other suitable position.

Figure 5:
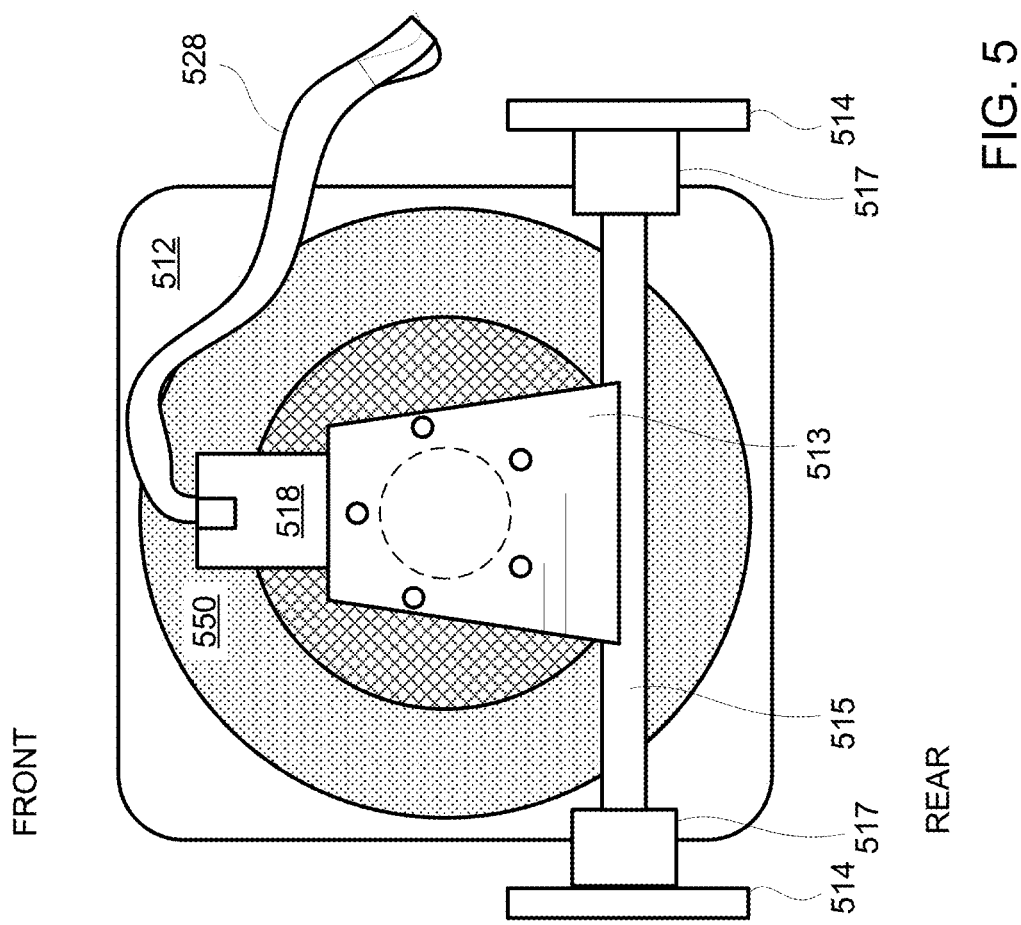
FIG. 5 shows a top view of the illustrative wheel assist system having rotational elements, in accordance with some embodiments of the present disclosure.

FIG. 5 shows a top view of the illustrative wheel assist system having rotational elements 517, in accordance with some embodiments of the present disclosure. The wheel assist system includes bin 512 (e.g., also referred to as a "recess"), carrier 513, structure 514 (e.g., also referred to as a "support"), rotational elements 517, hinge joint 515, arm 518, and strap 528 attached to arm 518, all configured to manage stowing and accessing spare tire 550. Carrier 513 and spare tire 550 are configured to rotate about a rotational axis of hinge joint 515. For example, a user may apply tension to strap 528, thus applying force on arm 518 and causing carrier 513, arm 518, and spare tire 550 to rotate about hinge joint 515. Arm 518 may be rigidly affixed to carrier 513, or may be a continuous extension of or otherwise a portion of carrier 513. Rotational elements 517 may include rotational dampers (e.g., that provide a torque countering rotation that may be proportional to rotational velocity), torsion springs (e.g., that apply a force dependent upon angular displacement), hard stops (e.g., that constrain rotational motion, such as bump stops or cables), detents (e.g., that discretize stable angular positions during rotation such as ratchet mechanism), a rotational encoder (e.g., configured to detect rotational motion, angular position, or both), a rotational actuator (e.g., configured to apply force based on an electromechanical device such as a motor), any other suitable rotational element, or any combination thereof. In some embodiment, rotational elements 517 include linear elements coupled to the hinge joint 515 that are configured to affect rotational motion, angular position, or both. For example, rotation elements 517 may include a linear spring coupled to an extension of hinge joint 515 for applying a torque to carrier 513. In some embodiments, hinge joint 515 may be actuated by a motor system that receives as input electrical energy, and converts the electrical energy to mechanical work in the form of applying a torque on carrier 513 during a rotational displacement.

The systems of the present disclosure allow users access to a spare tire, even if not physically capable of lifting a large spare tire that a vehicle may be equipped with. By adding the mechanical advantage of the carrier system, the positioning of the hinge joint may be tuned so that the maximum force required for spare tire removal is minimized, limited, or otherwise within a predetermined range.

In a further example, the systems of the present disclosure also mitigate the issues that arise from mounting a spare tire underneath a truck bed. For example, a spare tire mounted underneath a truck bed is exposed to all weather conditions including dirt, sharp objects, snow, and salt (e.g., which can cause wear, rust, damage, or a combination thereof). To illustrate, when a user needs to access their spare tire, it might be very dirty, rusted to the vehicle, or flat if mounted under the vehicle. Another issue with underneath-bed mounted spare tires is inaccessibility in adverse vehicle conditions such as, for example, a vehicle traversing deep snow or mud, articulating in such a way that the rear underside is touching or close to touching rocks or the ground, or standing in water.

In a further example, the systems of the present disclosure allow the spare tire to be more readily accessed for use, tire rotation, or any other suitable purpose. Some user with full size spare tires may like to rotate the spare tire onto the vehicle so that all five tires get even tread wear, thus requiring frequent access to the spare tire. For example, as compared to a system wherein the spare tire always gets dirty or rusty, the spare tire of the present disclosure will always be relatively clean when swapped out with an existing tire. Further, contrary to not having a rotating carrier, the removal process for the spare tire is much simpler.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for accessing a wheel of a vehicle, the system comprising:
   a support affixed in a recess of a vehicle bed, wherein the support is positioned below the surface of the vehicle bed;
   a carrier configured to be affixed to the wheel, wherein when the carrier is affixed to the wheel, both the carrier and the wheel are accommodated in the recess; and
   a hinge joint coupling the support and the carrier,
      wherein the hinge joint has an axis substantially parallel to the ground and laterally across the vehicle bed,
      wherein the carrier is capable of rotating about the hinge joint, and
      wherein the carrier and the wheel are capable of being rotated about the hinge joint out of the recess and onto the vehicle bed.

2. The system of claim 1, further comprising:
   a recess cover configured as part of a floor of the vehicle bed; and a hinge mechanism affixed to the vehicle bed allowing the recess cover to rotate to uncover the recess in the vehicle bed.

3. The system of claim 2, wherein:

the vehicle comprises a tailgate;

the tailgate is configured to move through a first trajectory;

the recess cover is configured to move through a second trajectory; and the tailgate and the recess cover do not interfere at any position in the first trajectory and the second trajectory.

4. The system of claim 1, further comprising a strap affixed to the carrier, wherein applying tension to the strap causes rotation of the carrier about the hinge joint.

5. The system of claim 1, further comprising a strap affixed to the wheel, wherein applying tension to the strap causes rotation of the carrier and the wheel about the hinge joint.

6. The system of claim 1, further comprising a rotational element for affecting rotational kinematics of the carrier and the wheel selected from the group comprising a torsion spring, rotational damper, a rotational detent, and a hard stop.

7. The system of claim 1, wherein:

the wheel comprises a diameter spanning from a rearward point to a forward point;

the wheel comprises a center point; and the hinge joint is arranged between the center point and the rearward point.

8. The system of claim 7, wherein the hinge joint is arranged between one-fourth and one-third the diameter from the rearward point.

9. The system of claim 1, wherein the hinge joint constrains the carrier to achieve only rotation motion relative to the support.

10. The system of claim 1, wherein:

in a stowed position, the wheel is arranged in the recess below the hinge joint and below a recess cover; and in an open position, the wheel is arranged above the hinge joint, rotated about the hinge joint substantially 180° relative to the stowed position.

11. The system of claim 1, wherein:

the vehicle bed comprises a fixed portion that is not configured to rotate;

in a stowed position, the wheel is arranged partially underneath the fixed portion of the vehicle bed; and in an open position, the wheel is arranged above the fixed portion of the vehicle bed.

12. The system of claim 11, wherein the fixed portion of the vehicle bed is arranged at a rear of the vehicle bed.

13. A system for accessing a wheel of a vehicle, the system comprising:

a bin structure that forms a recess arranged below a vehicle bed of the vehicle;

a carrier configured to be affixed to the wheel, wherein when the carrier is affixed to the wheel, both the carrier and the wheel are accommodated in the recess; and a hinge joint coupling the bin structure and the carrier, wherein the carrier is capable of rotating about the hinge joint, and wherein the carrier and the wheel are capable of being rotated about the hinge joint out of the recess and onto the vehicle bed.

14. The system of claim 13, wherein:

the vehicle bed comprises a fixed portion that is not configured to rotate;

in a stowed position, the wheel is arranged partially underneath the fixed portion of the vehicle bed; and in an open position, the wheel is arranged above the fixed portion of the vehicle bed.

15. The system of claim 14, wherein the fixed portion of the vehicle bed is arranged at a rear of the vehicle bed.

16. The system of claim 13, wherein:

the wheel comprises a diameter spanning from a rearward point to a forward point;

the wheel comprises a center point; and the hinge joint is arranged between the center point and the rearward point.

17. The system of claim 13, wherein the bin structure comprises a forward portion and a rearward portion, and wherein the rearward portion is deeper than the forward portion.

18. A system for accessing a wheel of a vehicle, the system comprising:

a carrier configured to be affixed to the wheel, wherein when the carrier is affixed to the wheel, both the carrier and the wheel are accommodated in a recess arranged below a vehicle bed; and a hinge joint coupling the carrier to the vehicle, wherein the carrier is capable of rotating about the hinge joint, wherein, in a stowed position, the wheel is arranged underneath a fixed portion of the vehicle bed, and wherein the carrier and the wheel are capable of being rotated about the hinge joint out of the recess and onto the vehicle bed.

19. The system of claim 18, wherein:

in the stowed position, the wheel is arranged in the recess below the hinge joint and below a recess cover; and in an open position, the wheel is arranged above the hinge joint, rotated about the hinge joint substantially 180° relative to the stowed position.

20. The system of claim 18, wherein the fixed portion of the vehicle bed is arranged at a rear of the vehicle bed.

* * * * *